(12) United States Patent
Do et al.

(10) Patent No.: US 6,835,476 B2
(45) Date of Patent: Dec. 28, 2004

(54) ANTIFERROMAGNETICALLY COUPLED MAGNETIC RECORDING MEDIA WITH COCRFE ALLOY FIRST FERROMAGNETIC FILM

(75) Inventors: Hoa Van Do, Fremont, CA (US); Mary F. Doerner, Santa Cruz, CA (US); Eric Edward Fullerton, Morgan Hill, CA (US); David T. Margulies, Los Gatos, CA (US); Natacha F. Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/386,834

(22) Filed: Mar. 11, 2003

(65) Prior Publication Data

US 2004/0180173 A1 Sep. 16, 2004

(51) Int. Cl.[7] .............................. G11B 5/66; G11B 5/70; H01J 1/00
(52) U.S. Cl. ......................... 428/694 TS; 428/694 TM; 428/611; 428/212; 428/900
(58) Field of Search .................... 428/694 TM, 694 TS, 428/212, 336, 900, 611

(56) References Cited

U.S. PATENT DOCUMENTS

| | | | |
|---|---|---|---|
| 6,280,813 B1 | 8/2001 | Carey et al. | |
| 6,537,684 B1 * | 3/2003 | Doerner et al. | 428/611 |
| 2002/0160234 A1 * | 10/2002 | Sakawaki et al. | 428/694 TS |
| 2003/0104247 A1 * | 6/2003 | Girt | 428/693 |

* cited by examiner

*Primary Examiner*—Holly Rickman
(74) *Attorney, Agent, or Firm*—Thomas R. Berthold; Lewis L. Nunnelley

(57) ABSTRACT

A magnetic recording medium for data storage uses a magnetic recording layer having at least two ferromagnetic films exchange coupled together antiferromagnetically across a nonferromagnetic spacer film. In this antiferromagnetically-coupled (AFC) recording layer the magnetic moments of the two ferromagnetic films are oriented antiparallel, and thus the net remanent magnetization-thickness product (Mrt) of the AFC recording layer is the difference in the Mrt values of the two ferromagnetic films. This reduction in Mrt is accomplished without a reduction in thermal stability of the recording medium. The lower ferromagnetic film in the AFC recording layer is a ferromagnetic CoCrFe alloy that does not require a nucleation layer between it and the Cr alloy underlayer. The medium with the CoCrFe alloy as the first or lower ferromagnetic film in the AFC recording layer has reduced intrinsic media noise.

11 Claims, 3 Drawing Sheets

ANTIFERROMAGNETICALLY COUPLED MAGNETIC RECORDING MEDIA WITH COCRFE ALLOY FIRST FERROMAGNETIC FILM

RELATED APPLICATION

This application is related to application Ser. No. 09/631, 908 filed Aug. 4, 2000, now U.S. Pat. No. 6,537,684, and titled "ANTIFERROMAGNETICALLY COUPLED MAGNETIC RECORDING MEDIA WITH BORON-FREE FIRST FERROMAGNETIC FILM AS NUCLEATION LAYER", which is incorporated herein by reference.

TECHNICAL FIELD

This invention relates generally to magnetic recording media, and more particularly to a magnetic recording disk with an antiferromagnetically-coupled (AFC) magnetic recording layer.

BACKGROUND OF THE INVENTION

Conventional magnetic recording media, such as the magnetic recording disks in hard disk drives, typically use a granular ferromagnetic layer, such as a sputter-deposited cobalt-platinum (CoPt) alloy, as the recording medium. Each magnetized domain in the magnetic layer is comprised of many small magnetic grains. The transitions between magnetized domains represent the "bits" of the recorded data. IBM's U.S. Pat. Nos. 4,789,598 and 5,523,173 describe this type of conventional rigid disk.

As the storage density of magnetic recording disks has increased, the product of the remanent magnetization Mr (where Mr is measured in units of magnetic moment per unit volume of ferromagnetic material) and the magnetic layer thickness t has decreased. Similarly, the coercive field or coercivity ($H_c$) of the magnetic layer has increased. This has led to a decrease in the ratio $Mrt/H_c$. The reason for this decrease is that the parameter $Mrt/H_c$ is related to the ability of the recording head to resolve the magnetic bits at high density. Decreasing $Mrt/H_c$ increases this ability. To achieve the reduction in Mrt, the thickness t of the magnetic layer can be reduced, but only to a limit because the stored magnetic information in the layer will be more likely to decay. This decay of the magnetization has been attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u/M_s$ ($M_s$=saturation magnetization), becomes too great to be written by a conventional recording head. A similar approach is to reduce the $M_s$ of the magnetic layer for a fixed layer thickness, which will reduce Mr since Mr is related to $M_s$, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

U.S. Pat. No. 6,280,813 describes a magnetic recording medium wherein the magnetic recording layer is at least two ferromagnetic films antiferromagnetically coupled together across a nonferromagnetic spacer film. In this type of magnetic media, referred to as AFC media, the magnetic moments of the two antiferromagnetically-coupled films are oriented antiparallel, with the result that the net remanent magnetization-thickness product (Mrt) of the recording layer is the difference in the Mrt values of the two ferromagnetic films. This reduction in Mrt is accomplished without a reduction in volume V. Therefore the thermal stability of the recording medium is not reduced. One of the ferromagnetic films is made thicker than the other, but the thicknesses are chosen so that the net moment in zero applied magnetic field is low, but nonzero. In one embodiment of the AFC medium both ferromagnetic films are sputter deposited CoPtCrB alloy films separated by a Ru spacer film that has a thickness to maximize the antiferromagnetic coupling between the two CoPtCrB films.

The use of a boron-containing alloy like CoPtCrB as the ferromagnetic film composition in an AFC medium requires the use of a special onset or nucleation layer to enhance the growth of the CoPtCrB films so that the C-axis of these films is in the plane of the films. The nucleation layer, which is typically a nonferromagnetic CoCr alloy, requires still another sputtering station in the manufacturing line. In the previously cited pending application, the lower ferromagnetic film in the AFC medium is a boron-free ferromagnetic CoCr alloy that does not require a nucleation layer between it and the Cr or Cr alloy underlayer. This ferromagnetic CoCr alloy has sufficient saturation magnetization ($M_s$) and grain structure to produce excellent magnetic recording performance for the AFC recording layer, while also serving as a nucleation layer to induce the in-plane C-axis growth of the upper CoPtCrB ferromagnetic film through the spacer layer.

A continuing problem in magnetic recording media is intrinsic media noise which is a significant contributor to the overall signal-to-noise ratio in the disk drive. What is needed is an AFC medium with reduced media noise.

SUMMARY OF THE INVENTION

The invention is an AFC magnetic recording medium having at least two ferromagnetic films exchange coupled together antiferromagnetically across a nonferromagnetic spacer film. In this antiferromagnetically-coupled (AFC) recording layer the magnetic moments of the two ferromagnetic films are oriented antiparallel, and thus the net remanent magnetization-thickness product (Mrt) of the AFC recording layer is the difference in the Mrt values of the two ferromagnetic films. This reduction in Mrt is accomplished without a reduction in thermal stability of the recording medium. The lower ferromagnetic film in the AFC recording layer is a ferromagnetic CoCrFe alloy that does not require a nucleation layer between it and the Cr alloy underlayer. The AFC medium with the CoCrFe alloy as the first or lower ferromagnetic film has reduced intrinsic media noise.

For a fuller understanding of the nature and advantages of the present invention, reference should be made to the following detailed description taken together with the accompanying figures.

DETAILED DESCRIPTION OF THE INVENTION

General Structure of an AFC Disk

Figure 1:
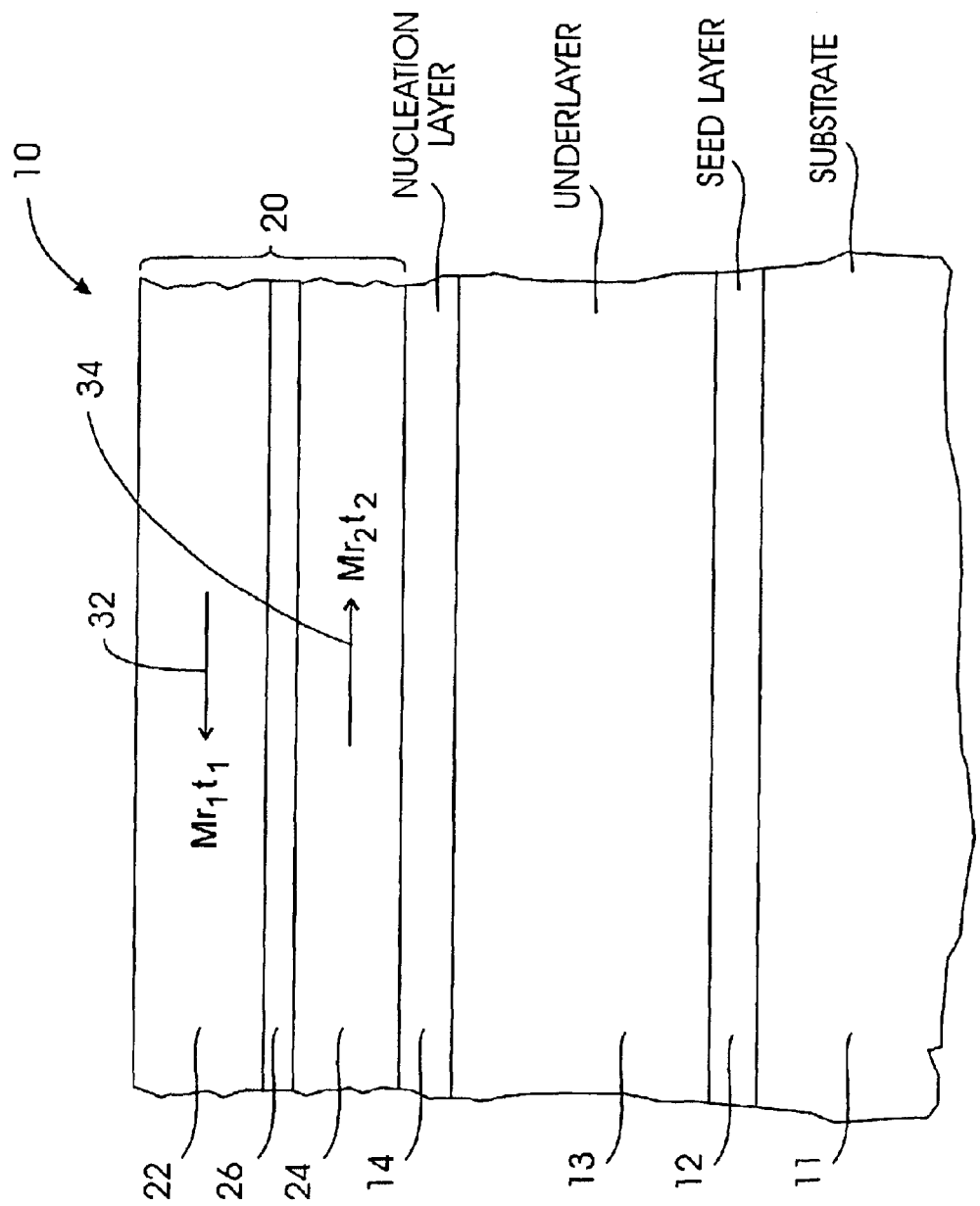
FIG. 1 is a prior art schematic sectional view of an AFC magnetic recording disk as described in the previously cited pending application.

The magnetic recording disk of the present invention is of the type that has a magnetic recording layer made of two or more ferromagnetic films that are coupled antiferromagnetically (AF) to their neighboring ferromagnetic films by one or more nonferromagnetic spacer films. FIG. 1 illustrates the cross sectional structure of a disk 10 with an antiferromagnetically-coupled (AFC) magnetic layer 20.

The disk substrate 11 is any suitable material, such as glass, SiC/Si, ceramic, quartz, or an AlMg alloy base with a NiP surface coating. The seed layer 12 is an optional layer that may be used to improve the growth of the underlayer 13. The seed layer 12 is most commonly used when the substrate 11 is nonmetallic, such as glass. The seed layer 12 has a thickness in the range of approximately 1 to 50 nm and is one of the materials, such as Ta, CrTi, NiAl or RuAl, which are useful as seed materials for promoting the growth of subsequently deposited layers in certain preferred crystalline orientations. A pre-seed layer (not shown) may also be used between the glass substrate 11 and the seed layer 12. The underlayer 13 is deposited onto the seed layer, if present, or otherwise directly onto the substrate 11, and is a nonmagnetic material such as chromium or a chromium alloy, such as CrV or CrTi. The underlayer 13 has a thickness in the range of 5 to 100 nm with a typical value being approximately 10 nm.

The AFC magnetic layer 20 is made up of two ferromagnetic films 22, 24 separated by a nonferromagnetic spacer film 26. The nonferromagnetic spacer film 26 thickness and composition are chosen so that the magnetic moments 32, 34 of adjacent films 22, 24, respectively, are AF-coupled through the nonferromagnetic spacer film 26 and are antiparallel in zero applied field. The two AF-coupled films 22, 24 of layer 20 have magnetic moments that are oriented antiparallel, with the upper film 22 having a larger moment. The ferromagnetic films 22, 24 are made of a CoPtCrB alloy with 4 to 20 atomic percent (at. %) platinum, 10 to 23 at. % chromium and 2 to 20 at. % boron. The nonferromagnetic spacer film 26 is ruthenium (Ru).

Because the first ferromagnetic film 24 of the AFC magnetic layer 20 is a boron-containing CoPtCrB alloy, a very thin (typically 1 to 5 nm) Co alloy onset or nucleation layer 14 is deposited on the underlayer 13. The nucleation layer 14 has a composition selected to enhance the growth of the hexagonal close-packed (HCP) CoPtCrB alloy of film 24 so that its C-axis is oriented in the plane of the film. The proper crystalline structure of the first CoPtCrB film 24 in turn enhances the growth of the second CoPtCrB film 22, through the Ru spacer film 26, to also have its C-axis in-plane. If the CoPtCrB film 24 were grown directly on the Cr alloy underlayer 13 without a nucleation layer, then it would not grow with its C-axis in the plane of the film, which would result in poor recording performance. It is well known that the presence of boron is important for achieving small grains in the recording layer, which is necessary for high performance media. Therefore, the nucleation layer 14 allows use of boron-containing alloys as the recording layer. The nucleation layer 14 typically is a nonferromagnetic Co alloy, such as a CoCr alloy with Cr>=31 at. %. This CoCr composition produces a phase which is nonferromagnetic or slightly ferromagnetic.

The AF coupling of ferromagnetic films via a nonferromagnetic transition metal spacer film, like the structure of layer 20 in FIG. 1, has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as Ru, chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality.

For this AFC structure of layer 20 the orientations of the magnetic moments 32, 34 of adjacent films 22, 24, respectively, are aligned antiparallel and thus add destructively. The arrows 32, 34 represent the moment orientations of individual magnetic domains that are directly above and below one another across the AF coupling film 26.

While FIG. 1 is shown for an AFC magnetic layer 20 with a two-film structure and a single spacer film, the AFC disk may have additional ferromagnetic films with AF-coupling spacer films between the ferromagnetic films.

Structure of an AFC Disk with a CoCrFe Lower Ferromagnetic Film

High performance commercially available disks using glass substrates and CoPtCrB single-layer magnetic layers can require up to six layers. These layers are a pre-seed layer on the glass substrate (not shown in FIG. 1), the seed layer, the underlayer, the nonferromagnetic (or slightly ferromagnetic) CoCr nucleation layer, the CoPtCrB magnetic layer, and the protective overcoat. Common manufacturing sputtering tools, such as the Circulus M12, currently have only seven stations available for actual sputter deposition, assuming the use of two heating stations and one cooling station. Since the AFC magnetic layer replaces the single magnetic layer with three layers, the total number of sputtering cathodes needed to create an AFC disk is eight. This number is larger than is currently available on the Circulus M12 configured as described above. Other types of manufacturing sputter tools may also have a limited number of sputtering cathodes, which makes implementation of AFC media difficult.

Certain materials can serve the dual purpose of acting as the lower ferromagnetic film in the AFC layer as well as facilitating the in-plane C-axis growth of the second CoPtCrB film through the Ru spacer layer. This allows a combination of the nucleation layer and the lower ferromagnetic film of the AFC layer into one layer and therefore only one sputtering cathode is required. This reduces the total number of sputtered layers in the AFC disk structure, thereby overcoming potential manufacturability problems. The previously cited pending application has demonstrated that ferromagnetic $Co_{78}Cr_{22}$, which has a saturation magnetization ($M_s$) of 425 emu/cc, acts as both an onset or nucleation layer and the lower film in the AFC structure.

In the present invention a CoCrFe alloy acts as both an onset or nucleation layer and the lower film in the AFC recording and also significantly improves the signal-to-noise ratio of the AFC media. This is a surprising result because the addition of Fe to Co alloys is known to add intergranular exchange coupling, which is generally considered to be deleterious to recording performance. As explained in the previously cited '813 patent, it is advantageous to use a granular ferromagnetic material with isolated magnetic grains, i.e., no intergranular exchange coupling, to lower the media noise because it has been shown that intergranular exchange coupling increases the media noise. Thus it is unexpected that the use of a CoCrFe lower film would decrease the media noise in the AFC media.

Figure 2:
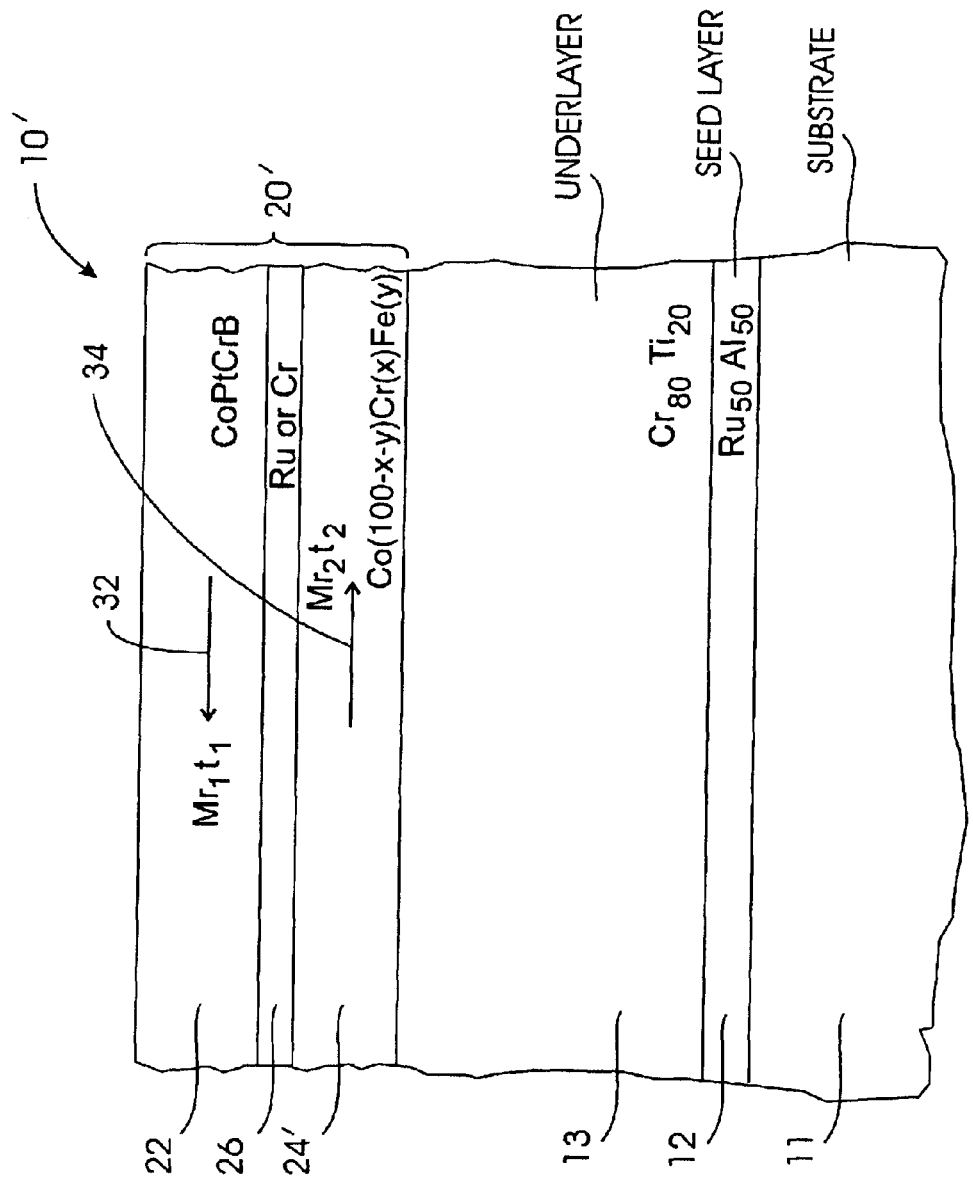
FIG. 2 is a schematic sectional view of an AFC magnetic recording disk according to the present invention.

FIG. 2 shows the preferred structure of the AFC disk 10' according to the invention. The thicknesses and compositions for the various layers in this preferred embodiment are as follows:

Pre-seed layer: $Cr_{50}Ti_{50}$ (20–50 nm)
Seed Layer 12: $Ru_{50}Al_{50}$ (8–20 nm)
Underlayer 13: $Cr_{80}Ti_{20}$ (6–20 nm)
Lower AFC Film 24' directly on underlayer 13:
    $Co_{(100-x-y)}Cr_xFe_y$ with $2<x<25$ and $2<y<30$
Spacer Layer 26: Ru or Cr (0.4–1.0 nm)
Top AFC Film 22: $Co_{(100-y-x-z)}Pt_yCr_xB_z$ with $6<y<25$, $10<x<25$, $6<z<15$.

In the preferred embodiment the CoCrFe alloy that serves as the bottom AFC film without the need for a special nucleation layer has an Fe composition between approximately 2 and 30 at. % and a Cr composition between approximately 2 and 25 at. %. The Fe concentration is determined primarily by the thickness and Mrt desired for the bottom AFC film. The at. % of Cr and Fe determines the Mrt of the CoCrFe film for a given thickness. The upper Fe limit is the amount around which the hcp structure of the CoCrFe alloy is lost and thus the subsequent in plane C-axis growth of the upper CoPtCrB film is compromised. The upper Cr limit of approximately 25 at. % is the amount around which the CoCrFe alloy becomes nonferromagnetic. The desired thickness of the CoCrFe film is determined by optimum film growth and recording performance, and is typically between approximately 0.5 and 3.5 nm.

Figure 3:
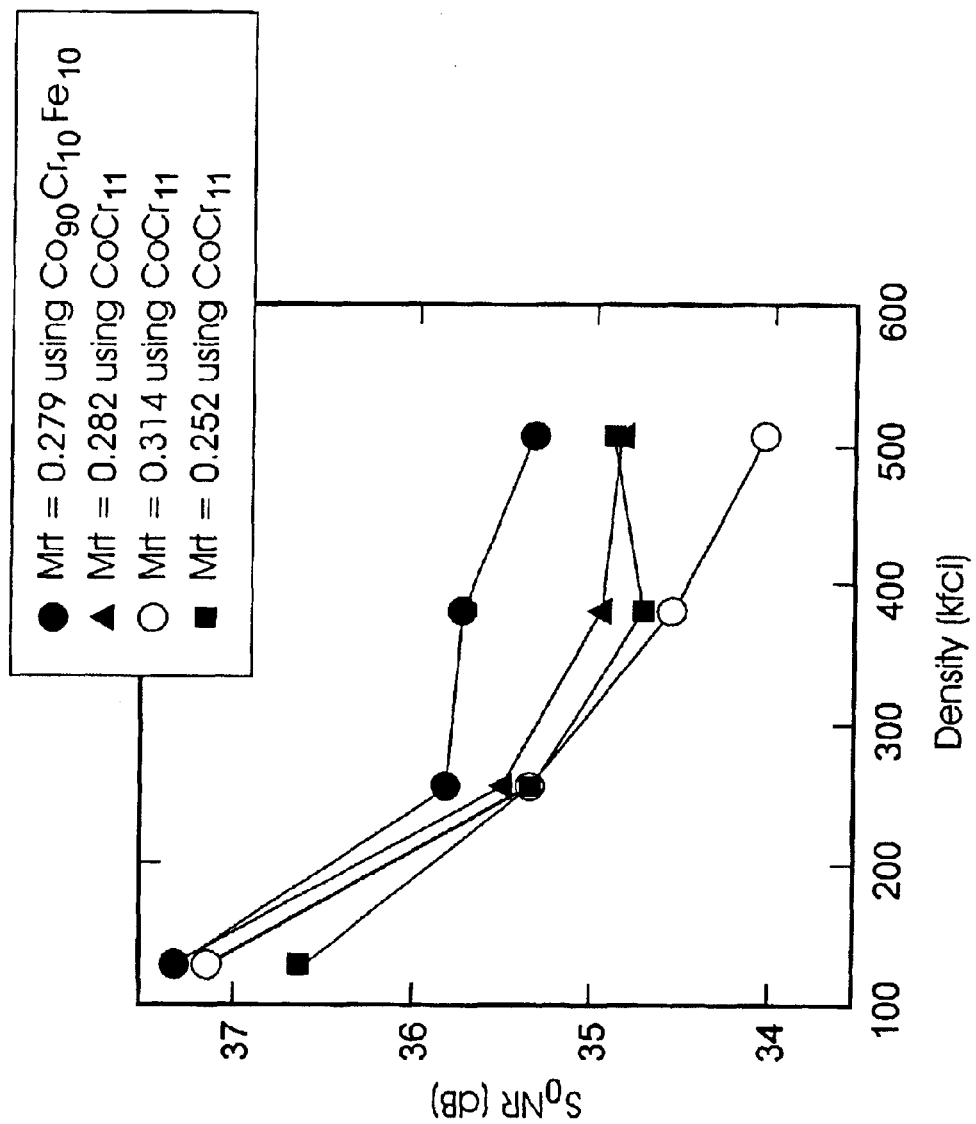
FIG. 3 is a graph of the measured ratio of the isolated signal pulse to the measured noise ($S_0NR$) for transitions recorded at different densities (thousand flux changes/inch or kfci) for several disks with the CoCrFe lower AFC film.

FIG. 3 shows the measured ratio of the isolated signal pulse to the measured noise ($S_0NR$) for transitions recorded at different densities (thousand flux changes/inch or kfci) for several disks. These media were all grown under the same growth conditions, with the same thicknesses and alloys used for both the underlayers and the top AFC film. The top AFC film has an Mrt=0.39 emu/cm². The composite Mrt is listed in the legend and is obtained by subtracting the Mrt of the lower AFC film from the Mrt of the top AFC film. FIG. 3 shows that the AFC media with the CoCrFe alloy as the lower film has significantly higher $S_0NR$ than the AFC media using the CoCr alloy described in the previously cited pending application as the lower film. FIG. 3 also shows that the improvement in $S_0NR$ is obtained in the AFC media with the CoCrFe lower film even compared to AFC media with the CoCr lower film with several different Mrt values.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording disk comprising:
   a substrate;
   a nonferromagnetic underlayer on the substrate;
   a first ferromagnetic film formed directly on and in contact with the underlayer, the first ferromagnetic film being an alloy consisting essentially of cobalt (Co), chromium (Cr) and iron (Fe);
   a nonferromagnetic spacer film on the first ferromagnetic film; and
   a second ferromagnetic film on the spacer film, the second ferromagnetic film being an alloy comprising Co and B, the second ferromagnetic film being exchange coupled antiferromagnetically to the first ferromagnetic film across the spacer film
   wherein the underlayer is an alloy of only Cr and titanium (Ti).

2. The disk of claim 1 further comprising a seed layer between the substrate and the underlayer and wherein the underlayer is formed directly on and in contact with the seed layer
   wherein the seed layer is an alloy of only ruthenium (Ru) and aluminum (Al).

3. The disk of claim 1 further comprising a seed layer between the substrate and the underlayer and wherein the underlayer is formed directly on and in contact with the seed layer wherein the seed layer is an alloy of only nickel (Ni) and aluminum (Al).

4. The disk of claim 1 wherein the second ferromagnetic film is an alloy further comprising Cr and Pt.

5. The disk of claim 1 wherein the first ferromagnetic film is an alloy of only Co, Cr and Fe.

6. The disk of claim 1 wherein the first ferromagnetic film has a composition of $Co_{(100-x-y)}Cr_xFe_y$ where x is between 2 and 25 and y is between 2 and 30.

7. The disk of claim 1 wherein the first ferromagnetic film has a thickness t1 and a magnetization M1, the second ferromagnetic film has a thickness t2 and a magnetization M2, and wherein the magnetic moments per unit area (M1×t1) and (M2×t2) of the first and second ferromagnetic films, respectively, are different from one another.

8. A magnetic recording disk comprising:
   a glass substrate;
   an underlayer selected from the group consisting of Cr, a CrV alloy and a CrTi alloy on the substrate;
   a magnetic recording layer on the underlayer and comprising a first ferromagnetic film of an alloy of only Co, Cr and Fe, with Cr being between approximately 2 and 25 atomic percent and Fe being between approximately 2 and 30 atomic percent, the first ferromagnetic film being directly on and in contact with the underlayer, a nonferromagnetic spacer film of a material selected from the group consisting of Ru, Cr, Rh, Ir, Cu and their alloys on the first ferromagnetic film, and a second ferromagnetic film of an alloy comprising Co and B on the spacer film, the spacer film having a thickness sufficient to induce the second ferromagnetic film to be exchange coupled antiferromagnetically to the first ferromagnetic film across the spacer film; and
   a protective overcoat formed on the magnetic recording layer.

9. The disk of claim 8 further comprising a seed layer between the substrate and the underlayer and wherein the underlayer is an alloy of only Cr and Ti and is formed directly on and in contact with the seed layer.

10. The disk of claim 9 wherein the seed layer is selected from the group consisting of a RuAl alloy and a NiAl alloy.

11. The disk of claim 10 wherein the spacer film is Ru.

* * * * *